US012736742B2

(12) United States Patent
Hayashi et al.

(10) Patent No.: US 12,736,742 B2
(45) Date of Patent: Sep. 15, 2026

(54) MULTI-CORE OPTICAL FIBER

(71) Applicant: SUMITOMO ELECTRIC INDUSTRIES, LTD., Osaka (JP)

(72) Inventors: Tetsuya Hayashi, Osaka (JP); Masaaki Hirano, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/725,346

(22) PCT Filed: Dec. 7, 2023

(86) PCT No.: PCT/JP2023/043799

§ 371 (c)(1),
(2) Date: Jun. 28, 2024

(87) PCT Pub. No.: WO2024/161793

PCT Pub. Date: Aug. 8, 2024

(65) Prior Publication Data

US 2026/0177738 A1 Jun. 25, 2026

(30) Foreign Application Priority Data

Jan. 31, 2023 (JP) ................................ 2023-012598

(51) Int. Cl.
*G02B 6/02* (2006.01)
*G02B 6/028* (2006.01)
*G02B 6/036* (2006.01)

(52) U.S. Cl.
CPC .......... *G02B 6/02* (2013.01); *G02B 6/02014* (2013.01); *G02B 6/02042* (2013.01);
(Continued)

(58) Field of Classification Search
CPC .. G02B 6/02; G02B 6/02014; G02B 6/02042; G02B 6/0281; G02B 6/0288; G02B 6/03644; G02B 6/0365
See application file for complete search history.

(56) References Cited

U.S. PATENT DOCUMENTS 7,787,731 B2 * 8/2010 Bookbinder ......... G02B 6/0288 385/127
9,798,043 B2 * 10/2017 Kihara .................. C03C 25/104
(Continued)

FOREIGN PATENT DOCUMENTS

JP 6715372 B1 7/2020
JP 2022-066053 A 4/2022
(Continued)

OTHER PUBLICATIONS

T. Hayashi et al., "Design strategy of uncoupled multicore fiber enabling high spatial capacity transmission", SUM2013, MC2. 4, pp. 78-79.

(Continued)

*Primary Examiner* — Jennifer Doan
(74) *Attorney, Agent, or Firm* — McDonald Hopkins LLC

(57) ABSTRACT

The multi-core optical fiber includes a plurality of cores, a first cladding, and a second cladding. The second cladding has a refractive index lower than a refractive index of each of the cores and higher than a refractive index of the first cladding. The multi-core optical fiber has a transmission loss of 0.22 dB/km or less. When an effective area of each of the cores is denoted as Aeff, a center-to-center distance between two cores is denoted as Λ, and a relative refractive index difference of each of the cores with respect to the refractive index of the first cladding is denoted as Δcore, Aeff1 is defined by (Continued)

$$Aeff1 = 18.6 - 4.63\ln(\Delta core) + 1.24\Lambda + 24.1[\ln(\Delta core)]2 - 6.05\times10 - 3\Lambda2 - 0.858\Lambda\ln(\Delta core),$$

and the multi-core optical fiber satisfies Condition below by using Aeff1.

$$0.35 \leq \Delta core \leq 1.00$$

$$25 \leq \Lambda \leq 50$$

$$0.80Aeff1 \leq Aeff \leq 1.35Aeff1$$

22 Claims, 7 Drawing Sheets

(52) U.S. Cl.
CPC ......... *G02B 6/0281* (2013.01); *G02B 6/0288* (2013.01); *G02B 6/03644* (2013.01); *G02B 6/0365* (2013.01)

(56) References Cited

U.S. PATENT DOCUMENTS

| | | | | |
|---|---|---|---|---|
| 10,673,197 | B2 * | 6/2020 | Kliner | H01S 3/121 |
| 2017/0351022 | A1 | 12/2017 | Nakanishi et al. | |
| 2018/0282200 | A1 | 10/2018 | Nakanishi et al. | |
| 2021/0294024 | A1 | 9/2021 | Li et al. | |
| 2022/0026629 | A1 | 1/2022 | Tandon et al. | |
| 2022/0120962 | A1 | 4/2022 | Hayashi | |
| 2022/0214496 | A1 | 7/2022 | Sakamoto et al. | |
| 2023/0288631 | A1 | 9/2023 | Sakuma et al. | |
| 2023/0333311 | A1 | 10/2023 | Hasegawa et al. | |
| 2023/0333312 | A1 | 10/2023 | Suganuma et al. | |
| 2023/0341618 | A1 | 10/2023 | Matsui et al. | |

FOREIGN PATENT DOCUMENTS

| | | | |
|---|---|---|---|
| WO | 2016/152507 | A1 | 9/2016 |
| WO | 2022/034662 | A1 | 2/2022 |
| WO | 2022/065435 | A1 | 3/2022 |
| WO | 2022/085534 | A1 | 4/2022 |
| WO | 2022/097639 | A1 | 5/2022 |

OTHER PUBLICATIONS

J. H. Chang et al., "Achievable capacity improvement by using multi-level modulation format in trench-assisted multi-core fiber system", Optics Express, pp. 14262-14271, vol. 21, No. 12, Jun. 17, 2013.

F. Ye et al., "Capacity of Space-Division Multiplexing with Heterogeneous Multi-Core Fibers", 2013 18th, OECC/PS FC.

H. Yoshikawa et al., "Analysis of Two-Core Single-Mode Optical Fibers for Subscriber Lines", Electronics and Communications in Japan, Part 2, vol. 72, No. 8, pp. 45-53, 1989.

R. J. Black et al., "Developments in the theory of equivalent-step-index fibers", J. Opt. Soc. Am. A, vol. 1, No. 11, pp. 1129-1131, Nov. 1984.

* cited by examiner

FIG. 3

MULTI-CORE OPTICAL FIBER

TECHNICAL FIELD

The present disclosure relates to a multi-core optical fiber. This application claims priority based on Japanese Patent Application No. 2023-012598 filed on Jan. 31, 2023, and the entire contents of the Japanese patent application are incorporated herein by reference.

BACKGROUND ART

Non-Patent Literatures 1 to 3 describe that the smaller an effective area (hereinafter, also referred to as Aeff) of each core of a multi-core optical fiber (hereinafter, also referred to as MCF) is, the stronger the confinement of light in each core can be made, and an inter-core power coupling coefficient (hereinafter, also referred to as PCC) and an inter-core crosstalk (hereinafter, also referred to as XT) can be reduced. Non-Patent Literature 1 describes a step-index (hereinafter, also referred to as SI) type MCF, Non-Patent Literature 2 describes a trench-assisted type MCF, and Non-Patent Literature 3 describes a hole-assisted type MCF. In an uncoupled MCF using individual cores as independent optical spatial channels, the reduction of PCC reduces an inter-core XT and increases the signal quality of each core.

CITATION LIST

Non Patent Literature

- Non-Patent Literature 1: T. Hayashi et al., "Design strategy of uncoupled multicore fiber enabling high spatial capacity transmission", SUM2013, MC2. 4
- Non-Patent Literature 2: J. H. Chang et al., "Achievable capacity improvement by using multi-level modulation format in trench-assisted multi-core fiber system", OPTICS EXPRESS 14262 Vol. 21, No. 12, 17 Jun. 2013
- Non-Patent Literature 3: F. Ye et al., "Capacity of Space-Division Multiplexing with Heterogeneous Multi-Core Fibers", 2013 18th OECC/PS, paper WR2-3.
- Non-Patent Literature 4: H. Yoshikawa et al., "Analysis of two core Single-Mode Optical Fibers for Subscriber Lines", Electronics and Communications in Japan, Part 2, Vol. 72, No. 8, P. 45-53, 1989
- Non-Patent Literature 5: R. J. Black et al., "Developments in the theory of equivalent-step-index fibers", J. Opt. Soc. Am. A, vol. 1, No. 11, p. 1129-1131 November 1984

SUMMARY OF INVENTION

An MCF according to the present disclosure is a common depressed cladding type MCF used for co-propagation, and includes a plurality of cores, a common first cladding surrounding each of the plurality of cores, and a second cladding surrounding the first cladding. The second cladding has a refractive index lower than a refractive index of each of the cores and higher than a refractive index of the first cladding. The MCF has a transmission loss of 0.22 dB/km or less at a wavelength of 1550 nm. When an effective area of each of the cores at a wavelength of 1550 nm is denoted as Aeff [$\mu m^2$], a center-to-center distance between two cores adjacent to each other of the cores in a cross section perpendicular to a fiber axis is denoted as $\Lambda$ [μm], and a relative refractive index difference of each of the cores with respect to the refractive index of the first cladding is denoted as $\Delta$core [%], Aeff1 [$\mu m^2$] is defined by $$Aeff1 = 18.6 - 4.63\ln(\Delta\text{core}) + 1.24\Lambda + 24.1[\ln(\Delta\text{core})]^2 - 6.05\times10^{-3}\Lambda^2 - 0.858\Lambda\ln(\Delta\text{core}),$$

and the MCF satisfies Condition 1a below by using Aeff1 [$\mu m^2$].

$$0.35[\%] \le \Delta\text{core}[\%] \le 1.00[\%]$$

$$25\,[\mu m] \le \Lambda[\mu m] \le 50\,[\mu m]$$

$$0.80Aeff1 \le Aeff \le 1.35Aeff1$$

BRIEF DESCRIPTION OF THE DRAWINGS

FIG. 3 is a graph showing a relationship between a radius of each of the cores and a relative refractive index difference of each of the cores with respect to a refractive index of a first cladding.

DETAILED DESCRIPTION

Figure 1:
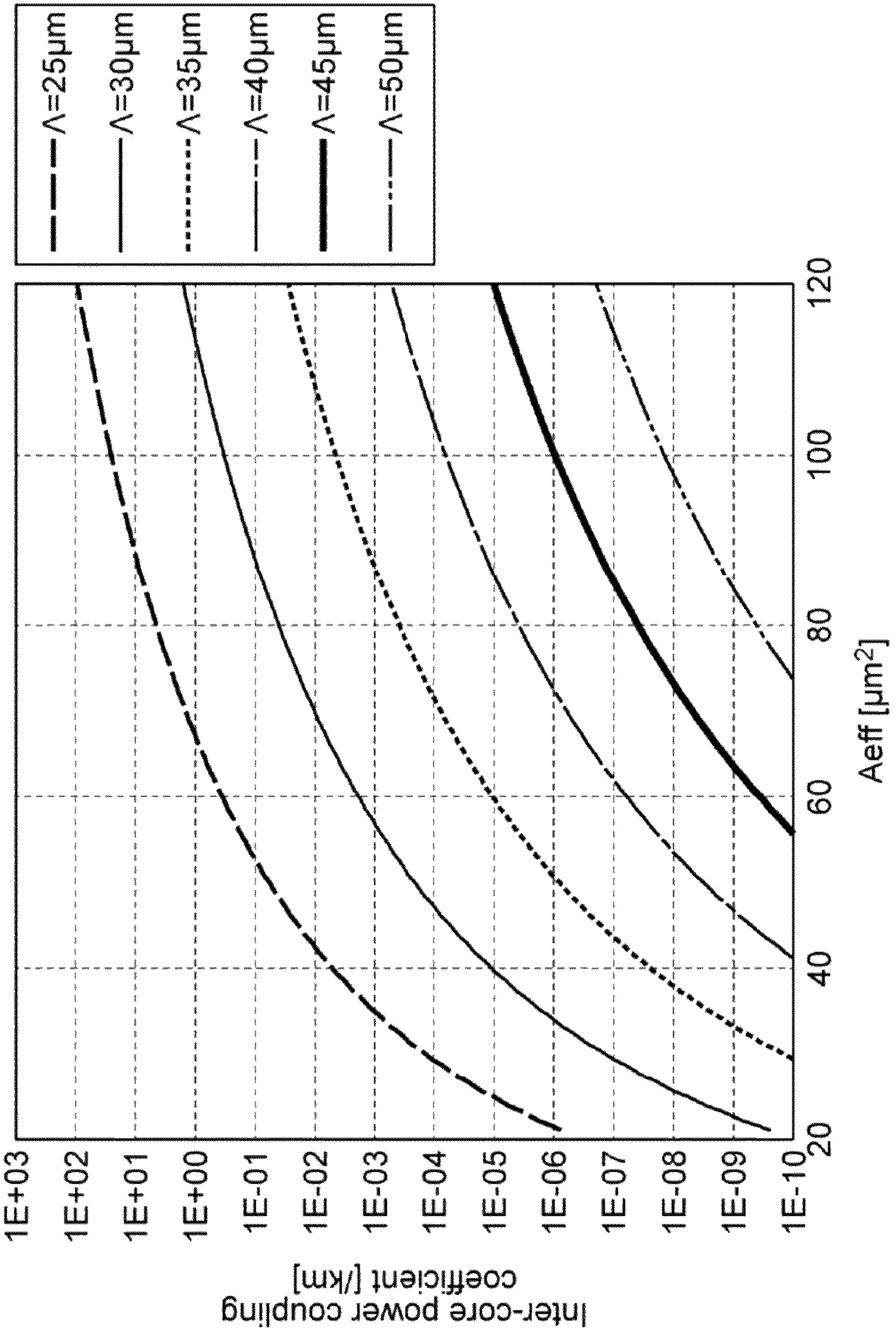
FIG. 1 is a graph showing a relationship between PCC and Aeff of each of cores.

Problems to be Solved by Present Disclosure

The inventors have found that, in a so-called common depressed cladding type MCF, when Aeff is excessively reduced, an inter-core PCC increases. The common depressed cladding type MCF is an MCF including a plurality of cores, a common first cladding surrounding the plurality of cores, and a second cladding surrounding the first cladding. The second cladding has a refractive index lower than a refractive index of each of the cores and higher than a refractive index of the first cladding.

An object of the present disclosure is to provide a common depressed cladding type MCF in which an inter-core XT can be reduced.

Advantageous Effects of Present Disclosure

According to the present disclosure, it is possible to provide a common depressed cladding type MCF in which an inter-core XT can be reduced.

DESCRIPTION OF EMBODIMENTS OF PRESENT DISCLOSURE

First, embodiments of the present disclosure will be listed and described.

(1) An MCF according to a first aspect of the present disclosure is a common depressed cladding type MCF used for co-propagation, and includes a plurality of cores; a common first cladding surrounding each of the plurality of cores and a second cladding surrounding the first cladding. The second cladding has a refractive index lower than a refractive index of each of the cores and higher than a refractive index of the first cladding. The MCF has a transmission loss of 0.22 dB/km or less at a wavelength of 1550 nm. When an effective area of each of the cores at a wavelength of 1550 nm is denoted as Aeff [$\mu m^2$], a center-to-center distance between two cores adjacent to each other of the cores in a cross section perpendicular to a fiber axis is denoted as Λ [μm], and a relative refractive index difference of each of the cores with respect to the refractive index of the first cladding is denoted as Δcore [%], Aeff1 [$\mu m^2$] is defined by $$Aeff1 = 18.6 - 4.63\ln(\Delta\text{core}) + 1.24\Lambda + 24.1[\ln(\Delta\text{core})]^2 - 6.05\times10^{-3}\Lambda^2 - 0.858\Lambda\ln(\Delta\text{core}),$$

the MCF satisfies Condition 1a below by using Aeff1 [$\mu m^2$].

$$0.35\,[\%] \le \Delta core\,[\%] \le 1.00\,[\%]$$

$$25\,[\mu m] \le \Lambda\,[\mu m] \le 50\,[\mu m]$$

$$0.80\,Aeff1 \le Aeff \le 1.35\,Aeff1$$

In this MCF, the first cladding functions as a common depressed cladding layer. Since an inter-core PCC of two adjacent cores (hereinafter, also referred to as a co-propagation PCC) can be reduced when signal lights are subjected to co-propagation, an inter-core XT of the two adjacent cores (hereinafter, also referred to as a co-propagation XT) can be reduced when the signal lights are subjected to co-propagation. The co-propagation PCC and the co-propagation XT can be suppressed to an increase of 3 dB or less from a minimum value. The co-propagation means that the signal lights of the two adjacent cores propagate in the same direction.

(2) In the above (1), Condition 1a may be further defined by an inequality below.

$$0.83\,Aeff1 \le Aeff \le 1.18\,Aeff1$$

In this case, the co-propagation PCC and the co-propagation XT can be suppressed to an increase of 1 dB or less from the minimum value.

(3) In the above (1), Condition 1a may be further defined by an inequality below.

$$0.90\,Aeff1 \le Aeff \le 1.12\,Aeff1$$

In this case, the co-propagation PCC and the co-propagation XT can be suppressed to an increase of 0.5 dB or less from the minimum value.

(4) In the above (1), Condition 1a may be further defined by an inequality below.

$$0.95\,Aeff1 \le Aeff \le 1.05\,Aeff1$$

In this case, the co-propagation PCC and the co-propagation XT can be suppressed to an increase of 0.1 dB or less from the minimum value.

(5) An MCF according to a second aspect of the present disclosure is a common depressed cladding type MCF used for co-propagation, and includes a plurality of cores; a common first cladding surrounding each of the plurality of cores; and a second cladding surrounding the first cladding. The second cladding has a refractive index lower than a refractive index of each of the core and higher than a refractive index of the first cladding. The MCF has a transmission loss of 0.22 dB/km or less at a wavelength of 1550 nm. When an effective area of each of the cores at a wavelength of 1550 nm is denoted as Aeff [$\mu m^2$], a center-to-center distance between two cores adjacent to each other of the cores in a cross section perpendicular to a fiber axis is denoted as Λ [μm], and a relative refractive index difference of each of the cores with respect to the refractive index of the first cladding is denoted as Δcore [%], Aeff1 [$\mu m^2$] is defined by $$Aeff1 = 18.6 - 4.63\ln(\Delta core) + 1.24\,\Lambda + 24.1\,[\ln(\Delta core)]^2 - 6.05\times10^{-3} - \Lambda^2 - 0.858\,\Lambda\ln(\Delta core),$$

and the MCF satisfies Condition 2a below by using Aeff1 [$\mu m^2$].

$$0.30\,[\%] \le \Delta core\,[\%] \le 0.35\,[\%]$$

$$20\,[\mu m] \le \Lambda\,[\mu m] \le 25\,[\mu m]$$

$$0.88\,Aeff1 \le Aeff \le 1.35\,Aeff1$$

In this MCF, the first cladding functions as a common depressed cladding layer. Since a co-propagation PCC can be reduced, a co-propagation XT can be reduced. The co-propagation PCC and the co-propagation XT can be suppressed to an increase of 3 dB or less from a minimum value.

(6) In the above (5), Condition 2a may be further defined by an inequality below.

$$0.90\,Aeff1 \le Aeff \le 1.18\,Aeff1$$

In this case, the co-propagation PCC and the co-propagation XT can be suppressed to an increase of 1 dB or less from the minimum value.

(7) In the above (5), Condition 2a may be further defined by an inequality below.

$$0.92\,Aeff1 \le Aeff \le 1.12\,Aeff1$$

In this case, the co-propagation PCC and the co-propagation XT can be suppressed to an increase of 0.5 dB or less from the minimum value.

(8) In the above (5), Condition 2a may be further defined by an inequality below.

$$0.96\,Aeff1 \le Aeff \le 1.05\,Aeff1$$

In this case, the co-propagation PCC and the co-propagation XT can be suppressed to an increase of 0.1 dB or less from the minimum value.

(9) An MCF according to a third aspect of the present disclosure is a common depressed cladding type MCF used for counter-propagation, and includes a plurality of cores; a common first cladding surrounding each of the plurality of cores; and a second cladding surrounding the first cladding. The second cladding has a refractive index lower than a refractive index of each of the cores and higher than a refractive index of the first cladding. The MCF has a transmission loss of 0.22 dB/km or less at a wavelength of 1550 nm. When an effective area of each of the cores at a wavelength of 1550 nm is denoted as Aeff [$\mu m^2$], a center-to-center distance between two cores adjacent to each other of the cores in a cross section perpendicular to a fiber axis is denoted as Λ [μm], and a relative refractive index difference of each of the cores with respect to the refractive index of the first cladding is denoted as Δcore [%], Aeff2 [$\mu m^2$] is defined by $$Aeff2 = 19.2 - 3.01\ln(\Delta core) + 1.40\Lambda + 25.6[\ln(\Delta core)]^2 - 7.72\times10^{-3}\Lambda^2 - 0.980\Lambda\ln(\Delta core),$$

and the MCF satisfies Condition 1b below by using Aeff2 [$\mu m^2$].

$$0.35\,[\%] \le \Delta core\,[\%] \le 1.00\,[\%]$$

$$25\,[\mu m] \le \Lambda\,[\mu m] \le 50\,[\mu m]$$

$$0.75\,Aeff2 \le Aeff \le 1.36\,Aeff2$$

In this MCF, the first cladding functions as a common depressed cladding layer. Since an inter-core PCC (hereinafter, also referred to as a counter-propagation PCC) of two adjacent cores can be reduced when signal lights are subjected to counter-propagation, an inter-core XT (hereinafter, also referred to as a counter-propagation XT) of the two adjacent cores can be reduced when the signal lights are subjected to counter-propagation. The counter-propagation PCC and the counter-propagation XT can be suppressed to an increase of 3 dB or less from a minimum value. The counter-propagation means that the signal lights of the two adjacent cores propagate in the opposite direction.

(10) In the above (9), Condition 1b may be further defined by an inequality below.

$$0.85\,Aeff2 \le Aeff \le 1.18\,Aeff2$$

In this case, the counter-propagation PCC and the counter-propagation XT can be suppressed to an increase of 1 dB or less from the minimum value.

(11) In the above (9), Condition 1b may be further defined by an inequality below.

$$0.89\,Aeff2 \le Aeff \le 1.12\,Aeff2$$

In this case, the counter-propagation PCC and the counter-propagation XT can be suppressed to an increase of 0.5 dB or less from the minimum value.

(12) In the above (9), Condition 1b may be further defined by an inequality below.

$$0.95\,Aeff2 \le Aeff \le 1.05\,Aeff2$$

In this case, the counter-propagation PCC and the counter-propagation XT can be suppressed to an increase of 0.1 dB or less from the minimum value.

(13) An MCF according to a fourth aspect of the present disclosure is a common depressed cladding type MCF used for counter-propagation, and includes a plurality of cores; a common first cladding surrounding each of the plurality of cores; and a second cladding surrounding the first cladding. The second cladding has a refractive index lower than a refractive index of each of the cores and higher than a refractive index of the first cladding. The MCF has a transmission loss of 0.22 dB/km or less at a wavelength of 1550 nm. When an effective area of each of the cores at a wavelength of 1550 nm is denoted as Aeff [$\mu m^2$], a center-to-center distance between two cores adjacent to each other of the cores in a cross section perpendicular to a fiber axis is denoted as Λ [μm], and a relative refractive index difference of each of the cores with respect to the refractive index of the first cladding is denoted as Δcore [%], Aeff2 [$\mu m^2$] is defined by $$Aeff2 = 19.2 - 3.01\ln(\Delta core) + 1.40\Lambda + 25.6[\ln(\Delta core)]^2 - 7.72\times10^{-3}\Lambda^2 - 0.980\Lambda\ln(\Delta core),$$

and the MCF satisfies Condition 2b below by using Aeff2 [$\mu m^2$].

$$0.30\,[\%] \le \Delta core\,[\%] \le 0.35\,[\%]$$

$$20\,[\mu m] \le \Lambda\,[\mu m] \le 25\,[\mu m]$$

$$0.84\,Aeff2 \le Aeff \le 1.36\,Aeff2$$

In this MCF, the first cladding functions as a common depressed cladding layer. Since a counter-propagation PCC can be reduced, a counter-propagation XT can be reduced. The counter-propagation PCC and the counter-propagation XT can be suppressed to an increase of 3 dB or less from a minimum value.

(14) In the above (13), Condition 2b may be further defined by an inequality below.

$$0.88\,Aeff2 \le Aeff \le 1.18\,Aeff2$$

In this case, the counter-propagation PCC and the counter-propagation XT can be suppressed to an increase of 1 dB or less from the minimum value.

(15) In the above (13), Condition 2b may be further defined by an inequality below.

$$0.90\,Aeff2 \le Aeff \le 1.12\,Aeff2$$

In this case, the counter-propagation PCC and the counter-propagation XT can be suppressed to an increase of 0.5 dB or less from the minimum value.

(16) In the above (13), Condition 2b may be further defined by an inequality below.

$$0.95\,Aeff2 \le Aeff \le 1.05\,Aeff2$$

In this case, the counter-propagation PCC and the counter-propagation XT can be suppressed to an increase of 0.1 dB or less from the minimum value.

(17) In any one of the above (1) to (16), when a radius of each of the cores is denoted as ra [μm], a cable cutoff wavelength is denoted as λcc [nm], and a relative refractive index difference of each of the cores with respect to the refractive index of the first cladding is denoted as Δcore [%], the MCF satisfies Condition 3, Condition 4, Condition 5, or Condition 6.

Condition 3 is defined by an inequality below.

$$\lambda cc\,[\text{nm}] \le 1260\,[\text{nm}]$$

$$ra\,[\mu\text{m}] \ge 2.51\,(\Delta core)^{-0.605}\,[\mu\text{m}]$$

Condition 4 is defined by an inequality below.

$$\lambda cc\,[\text{nm}] \le 1360\,[\text{nm}]$$

$$ra\,[\mu\text{m}] \ge 2.71\,(\Delta core)^{-0.607}\,[\mu\text{m}]$$

Condition 5 is defined by an inequality below.

$$\lambda cc\,[\text{nm}] \le 1460\,[\text{nm}]$$

$$ra\,[\mu\text{m}] \ge 2.92\,(\Delta core)^{-0.609}\,[\mu\text{m}]$$

Condition 6 is defined by an inequality below.

$$\lambda cc\,[\text{nm}] \le 1530\,[\text{nm}]$$

$$ra\,[\mu\text{m}] \ge 3.06\,(\Delta core)^{-0.611}\,[\mu\text{m}]$$

In this case, the confinement of signal light in each of the cores can be strengthened.

(18) In any one of the above (1) to (17), the multi-core optical fiber may further include a third cladding surrounded by the first cladding. The third cladding may be disposed on a line segment connecting centers of the two adjacent cores in the cross section perpendicular to the fiber axis in such a manner as to be separated from each of the two adjacent cores. The third cladding may have a refractive index lower than the refractive index of the first cladding.

In this case, the inter-core PCC and the inter-core XT can be further reduced.

(19) In the above (18), the third cladding may have a circular shape in the cross section perpendicular to the fiber axis.

In this case, the MCF can be more easily manufactured.

(20) In any one of the above (1) to (19), the plurality of cores, the first cladding, and the second cladding may each contain silica-based glass.

In this case, a low transmission loss can be achieved in a wavelength band used for optical communication from 1260 nm to 1625 nm. High manufacturability can be also achieved.

DETAILS OF EMBODIMENTS OF PRESENT DISCLOSURE

Specific examples of an MCF according to the present embodiment will be described with respect to the drawings as necessary. The present disclosure is not limited to these examples, but is defined by the appended claims, and is intended to include all modifications within the scope and meaning equivalent to the appended claims. In the description of the drawings, the same elements are denoted by the same reference numerals, and redundant description will be omitted.

In the SI-type (more precisely, matched cladding type) MCF as described in Non-Patent Literature 1, for example, in order to perform optical signal transmission by operating each of cores in a single mode at a wavelength 1550 nm, a cable cutoff wavelength (hereinafter, also referred to as λcc) of each of the cores is set to be equal to or less than 1530 nm. In this case, in order to reduce an inter-core PCC and an inter-core XT, it is desirable to strengthen the confinement of light in the cores by increasing λcc as much as possible. By reducing the inter-core PCC to reduce the inter-core XT, a core density (the number of cores per cross-sectional area) on a cross section of the MCF can be increased while the quality of the transmission signal is maintained.

FIG. 1 is a graph showing a relationship between an inter-core PCC of two adjacent cores and Aeff of each of the cores at a wavelength of 1550 nm when λcc of each of the cores is fixed at the 1530 nm, for example. A vertical axis in FIG. 1 represents the inter-core PCC [/km]. A horizontal axis in FIG. 1 represents Aeff [$\mu m^2$]. FIG. 1 shows the cases where a center-to-center distance Λ of the cores is set to 25 μm, 30 μm, 35 μm, 40 μm, 45 μm, and 50 μm.

Although a value of PCC varies depending on the center-to-center distance between two adjacent cores, it is understood that PCC (represented by the symbol h) decreases exponentially as Aeff decreases. In the SI type core or the matched cladding type core, when λcc and Aeff are determined, a relative refractive index difference of each of the cores with respect to a refractive index of a cladding and a core radius are uniquely determined. This is because the degree of freedom in design is limited to the relative refractive index difference of each of the cores and the core radius.

Non-Patent Literature 4 discloses that a graded-index type core has the same PCC as the SI type core as long as a spot diameter and λcc of the graded-index type core are equal to those of the SI type core. Therefore, it is understood that, in the graded-index type core, as in the SI type core, PCC h decreases exponentially as Aeff decreases.

For the trench-assisted type and hole-assisted type MCFs, there is more degree of freedom in design. Therefore, the refractive index profile and the confinement of light in the cores are not uniquely determined only by λcc and Aeff. When the values from the lowest refractive index of the trench or the hole to the highest refractive index of the cores are fixed, as shown in Non-Patent Literature 2 and Non-Patent Literature 3, the smaller Aeff is, the stronger the confinement of light in the cores can be made, and the PCC h is reduced exponentially.

Figure 2:
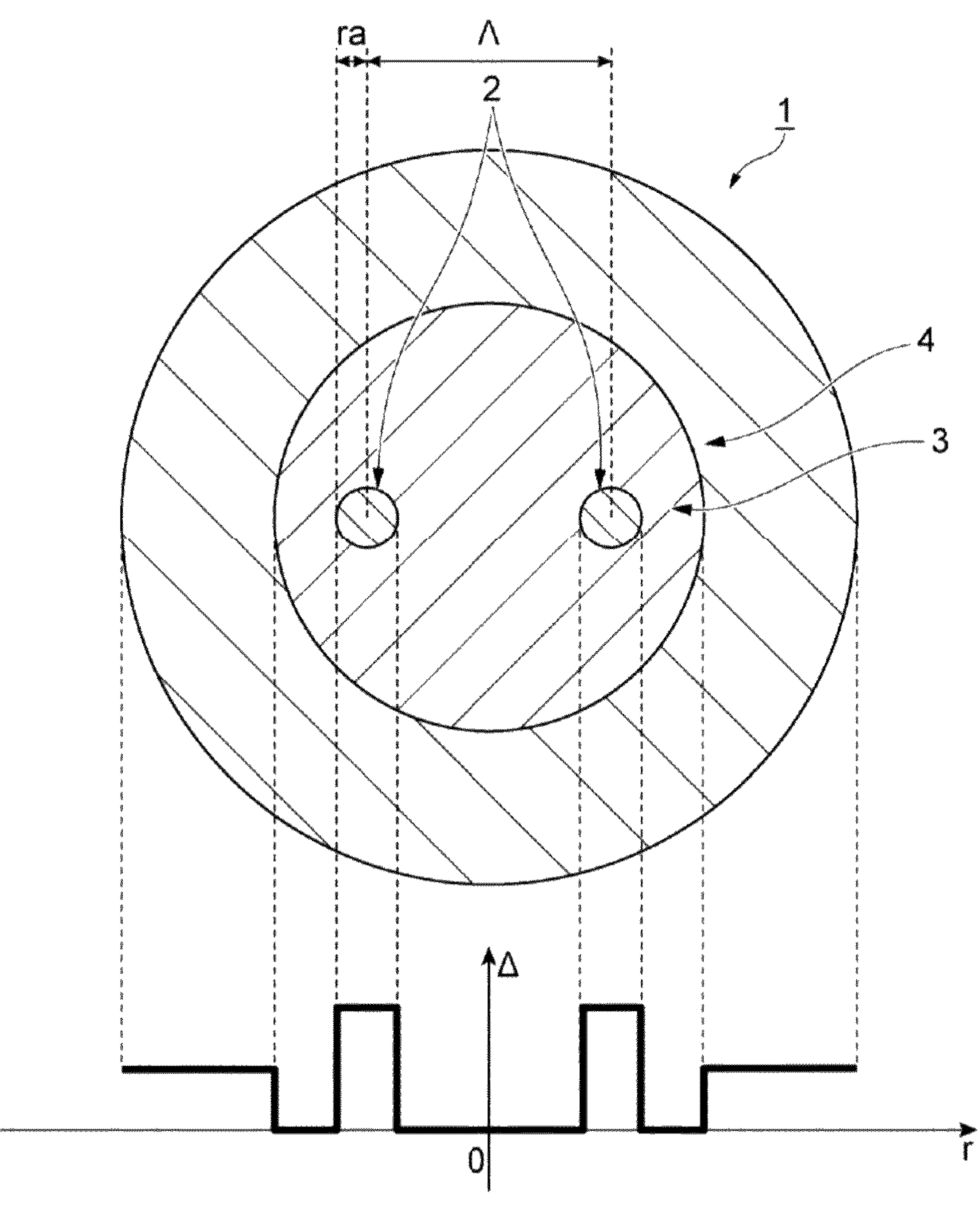
FIG. 2 is a diagram showing a cross section perpendicular to a fiber axis and a refractive index profile in an MCF according to an embodiment.

FIG. 2 is a diagram showing a cross section perpendicular to a fiber axis of a MCF and a refractive index profile according to the embodiment. As shown in FIG. 2, a MCF 1 according to the embodiment includes a plurality of cores 2, a common first cladding 3, and a second cladding 4. Each of cores 2, first cladding 3, and second cladding 4 contains silica-based glass. MCF 1 has a transmission loss of 0.22 dB/km or less at 1550 nm. The silica-based glass is glass containing silica as a main component and has a silica content of 90% or more.

The plurality of cores 2 have the same circular shape as each other in a cross section perpendicular to the fiber axis. A radius ra of each of cores 2 is, for example, from 3 μm to 7 μm. Each of cores 2 extends along the fiber axis of MCF 1. In the present embodiment, MCF 1 is a 2-core optical fiber, and the number of cores 2 is two, but not limited thereto. In the cross section perpendicular to the fiber axis, two cores 2 are disposed to face each other across a center axis of MCF 1. In the cross section perpendicular to the fiber axis, two cores 2 are disposed at equal distances from the center axis. In the cross section perpendicular to the fiber axis, a center-to-center distance Λ between two adjacent cores 2 is, for example, from 30 μm to 50 μm.

First cladding 3 is a common cladding surrounding the plurality of cores 2. First cladding 3 covers outer peripheral surfaces of the plurality of cores 2. First cladding 3 has a circular shape in the cross section perpendicular to the fiber axis. Second cladding 4 is a common cladding surrounding first cladding 3. Second cladding 4 covers an outer peripheral surface of first cladding 3. For example, the shortest distance from an interface between first cladding 3 and second cladding 4 to a center of each of the plurality of cores 2 is from 15 μm to 20 μm. Second cladding 4 has a circular shape in the cross section perpendicular to the fiber axis. Second cladding 4 has a radius of, for example, 50 μm to 100 μm, or 62 μm to 63 μm.

Second cladding 4 has a refractive index lower than a refractive index of each of cores 2 and higher than a refractive index of first cladding 3. Second cladding 4 has a relative refractive index difference of 0.02% or more with respect to the refractive index of first cladding 3. Each of cores 2 has a relative refractive index difference of 0.30% to 1.00% with respect to the refractive index of first cladding 3. The difference between the relative refractive index difference of each of cores 2 and the relative refractive index difference of second cladding 4 is 0.20% or more. The refractive index profile in FIG. 2 is shown with a vertical axis as a relative refractive index difference Δ with respect to the refractive index of first cladding 3, and a horizontal axis as a radial position r. Radial position r is zero at a fiber center. MCF 1 is a common depressed cladding type MCF. First cladding 3 functions as a common depressed cladding layer.

In MCF 1, Condition 1a or Condition 2a is satisfied when an effective area of each of cores 2 at a wavelength of 1550 nm is denoted as Aeff [μm$^2$], a center-to-center distance between two cores adjacent to each other of the cores 2 in the cross section perpendicular to the fiber axis is denoted as Λ [μm], a relative refractive index difference of each of cores 2 with respect to the refractive index of first cladding 3 is Δcore [%], and Aeff1 [μm$^2$] is defined by the following equation.

$$Aeff1 = 18.6 - 4.63\ln(\Delta core) + 1.24\Lambda + 24.1[\ln(\Delta core)]^2 - 6.05\times10^{-3}\Lambda^2 - 0.858\Lambda\ln(\Delta core)$$

In the above equation, when Aeff1 is expressed in units of [μm$^2$], coefficients of the constants are expressed in the following units.

$$18.6\,[\mu m^2]\cdot -4.63\,[\mu m^2]\cdot 1.24\,[\mu m]\cdot 24.1\,[\mu m^2]\cdot -6.05\times 10^{-3}[-(\text{no unit})]\cdot 0.858\,[\mu m].$$

Condition 1a and Condition 2a are defined by inequalities below.

That is, Aeff means a numerical value of an effective area expressed in units of [μm$^2$], Λ means a numerical value of a center-to-center distance expressed in units of [μm], Δcore means a numerical value of a relative refractive index difference expressed in units of [%], and Aeff1 means a numerical value expressed in units of [μm$^2$].

$$0.35\,[\%] \le \Delta core\,[\%] \le 1.00\,[\%] \quad \text{(Condition 1a)}$$

$$25\,[\mu m] \le \Lambda\,[\mu m] \le 50\,[\mu m]$$

$$0.80\,Aeff1 \le Aeff \le 1.35\,Aeff1$$

$$0.30\,[\%] \le \Delta core\,[\%] \le 0.35\,[\%] \quad \text{(Condition 2a)}$$

$$20\,[\mu m] \le \Lambda\,[\mu m] \le 25\,[\mu m]$$

$$0.88\,Aeff1 \le Aeff \le 1.35\,Aeff1$$

Condition 1a may be further defined by any of inequalities below.

$$0.83\,Aeff1 \le Aeff \le 1.18\,Aeff1$$

$$0.90\,Aeff1 \le Aeff \le 1.12\,Aeff1$$

$$0.95\,Aeff1 \le Aeff \le 1.05\,Aeff1$$

Condition 2a may be further defined by any of inequalities below.

$$0.90\,Aeff1 \le Aeff \le 1.18\,Aeff1$$

$$0.92\,Aeff1 \le Aeff \le 1.12\,Aeff1$$

$$0.96\,Aeff1 \le Aeff \le 1.05\,Aeff1$$

In MCF 1, Condition 1b or Condition 2b is satisfied when the effective area of each of cores 2 at a wavelength of 1550 nm is denoted as Aeff [μm$^2$], the center-to-center distance between two cores adjacent to each other of the cores 2 in the cross section perpendicular to the fiber axis is denoted as Λ [μm], the relative refractive index difference of each of cores 2 with respect to the refractive index of first cladding 3 is denoted as Δcore [%], and Aeff2 [μm$^2$] is defined by the following equation.

$$Aeff2 = 19.2 - 3.01\ln(\Delta core) + 1.40\Lambda + 25.6[\ln(\Delta core)]^2 - 7.72\times10^{-3}\Lambda^2 - 0.980\Lambda\ln(\Delta core)$$

In the above equation, when Aeff2 is expressed in units of [$\mu m^2$], coefficients of the constants are expressed in the following units.

$$19.2\,[\mu m^2]\cdot -3.01\,[\mu m^2]\cdot 1.40\,[\mu m]\cdot 25.6\,[\mu m^2]\cdot -7.72\times 10^{-3}\,[-(\text{no unit})]\cdot -0.980\,[\mu m].$$

That is, Aeff means a numerical value of the effective area expressed in units of [$\mu m^2$], Λ means a numerical value of the center-to-center distance expressed in units of [μm], Δcore means a numerical value of the relative refractive index difference expressed in units of [%], and Aeff2 means a numerical value expressed in units of [$\mu m^2$]. Condition 1b and Condition 2b are defined by inequalities below.

$$0.35[\%] \le \Delta core\,[\%] \le 1.00[\%] \quad \text{(Condition 1b)}$$
$$25\,[\mu m] \le \Lambda[\mu m] \le 50\,[\mu m]$$
$$0.75Aeff2 \le Aeff \le 1.36Aeff2$$
$$0.30[\%] \le \Delta core\,[\%] \le 0.35[\%] \quad \text{(Condition 2b)}$$
$$20\,[\mu m] \le \Lambda[\mu m] \le 25\,[\mu m]$$
$$0.84Aeff2 \le Aeff \le 1.36Aeff2$$

Condition 1b may be further defined by any of inequalities below.

$$0.85Aeff2 \le Aeff \le 1.18Aeff2$$
$$0.89Aeff2 \le Aeff \le 1.12Aeff2$$
$$0.95Aeff2 \le Aeff \le 1.05Aeff2$$

Condition 2b may be further defined by any of inequalities below.

$$0.88Aeff2 \le Aeff \le 1.18Aeff2$$
$$0.90Aeff2 \le Aeff \le 1.12Aeff2$$
$$0.95Aeff2 \le Aeff \le 1.05Aeff2$$

In the common depressed cladding type, λcc in a case of considering only a waveguide structure portion including cores 2 and the common depressed cladding layer (that is, first cladding 3) has a value larger than that of a desired λcc. A higher-order mode leaks into second cladding 4 by adjusting the relative refractive index difference of second cladding 4 with respect to the refractive index of first cladding 3 and adjusting the shortest distance between the center of each of cores 2 and second cladding 4 in the cross section perpendicular to the fiber axis. Thus, λcc can be adjusted to a desired value. Radius ra of each of cores 2 and relative refractive index difference Δcore of each of cores 2 with respect to the refractive index of common first cladding 3 can freely take independent values with respect to λcc. In addition, according to MCF 1, PCC h can be reduced when the same λcc is achieved, compared to an SI-type, a matched cladding type or a trench-assisted type MCF.

In order to strengthen the confinement in each of cores 2 at least as compared to the SI type and the matched cladding type, it is desirable to set the virtual λcc, in the case where only the waveguide structure portion including cores 2 and the sufficiently extended common depressed cladding layer (that is, first cladding 3) is considered, to a value larger than an upper limit value of a desired λcc. In order to achieve the above in a common depressed cladding type MCF, it is desirable to satisfy Condition 3, Condition 4, Condition 5, or Condition 6 defined by inequalities below when a radius of each of cores 2 is denoted as ra [μm], a cable cutoff wavelength is denoted as λcc [nm], and a relative refractive index difference of each of cores 2 with respect to refractive index of first cladding 3 is denoted as Δcore [%].

$$\lambda cc\,[nm] \le 1260\,[nm] \quad \text{(Condition 3)}$$
$$ra[\mu m] \ge 2.51(\Delta core)^{-0.605}[\mu m]$$
$$\lambda cc\,[nm] \le 1360\,[nm] \quad \text{(Condition 4)}$$
$$ra[\mu m] \ge 2.71(\Delta core)^{-0.607}[\mu m]$$
$$\lambda cc\,[nm] \le 1460\,[nm] \quad \text{(Condition 5)}$$
$$ra[\mu m] \ge 2.92(\Delta core)^{-0.609}[\mu m]$$
$$\lambda cc\,[nm] \le 1530\,[nm] \quad \text{(Condition 6)}$$
$$ra[\mu m] \ge 3.06(\Delta core)^{-0.611}[\mu m]$$

MCF 1 satisfies Condition 3, Condition 4, Condition 5, and Condition 6. Here, λcc means a numerical value of a cable cutoff wavelength expressed in units of [nm], ra means a numerical value of a radius expressed in units of [μm], and Δcore means a numerical value of a relative refractive index difference in units of [%]. In this case, coefficients of the constants on the right-hand sides of Conditions 3 to 6 are expressed in units of [μm]. That is, the coefficients of the constants are 2.51 [μm] for Condition 3, 2.71 [μm] for Condition 4, 2.92 [μm] for Condition 5, and 3.06 [μm] for Condition 6.

Figure 3:
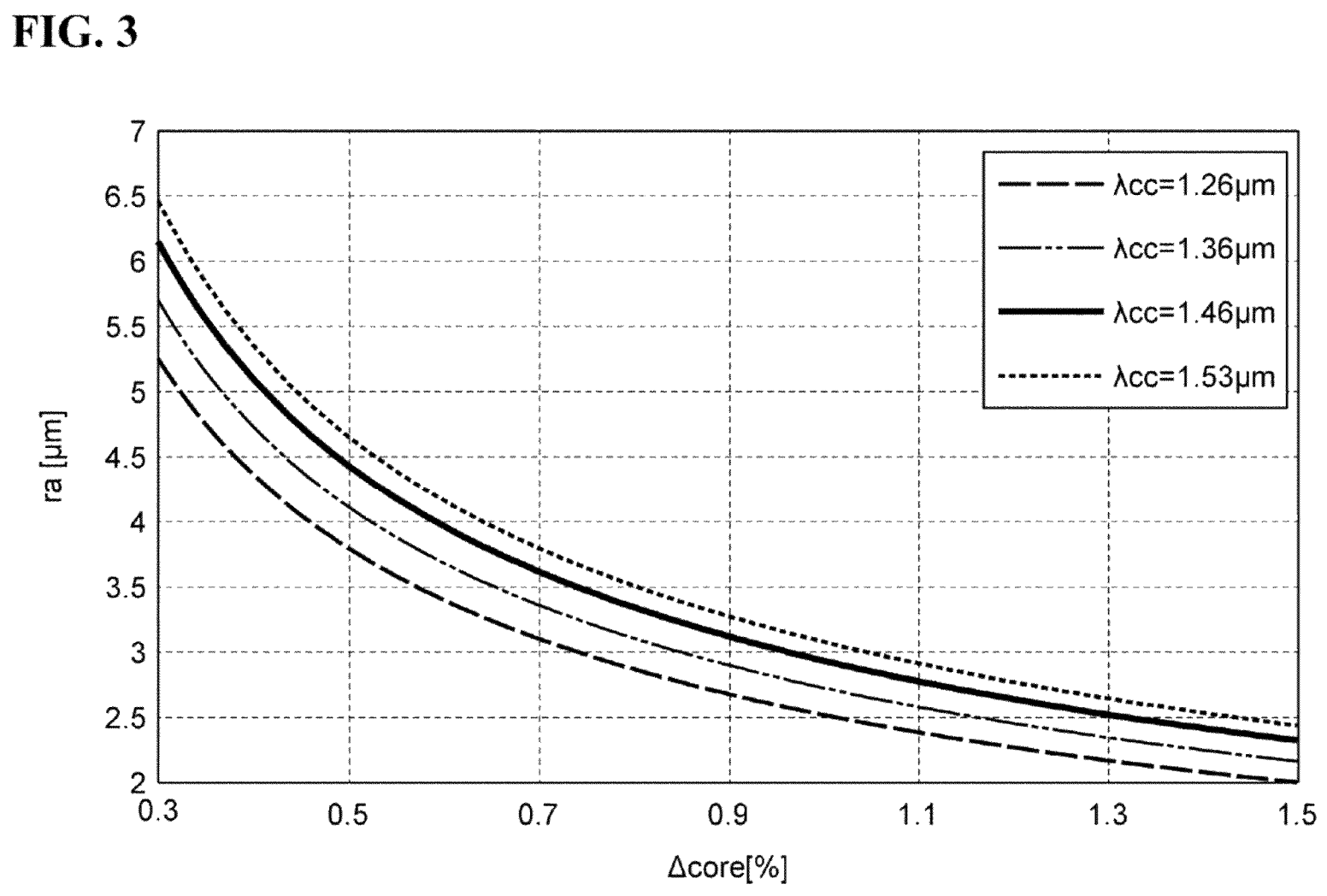

FIG. 3 is a graph showing a relationship between a radius of each of cores and a relative refractive index difference of each of the cores with respect to a refractive index of a first cladding. A vertical axis in FIG. 3 represents radius ra [μm] of each of the cores. A horizontal axis in FIG. 3 represents a relative refractive index difference [%] of each of the cores with respect to the refractive index of the first cladding. FIG. 3 shows cases where λcc is set to 1.26 μm, 1.36 μm, 1.46 μm, and 1.53 μm. That is, the lines shown in FIG. 3 correspond to the cases where the two inequalities hold for each of Condition 3, Condition 4, Condition 5, and Condition 6. Regions above these lines are desired regions.

In many cases, the refractive index profile of an actual optical fiber is not strictly of the SI type. In this case, Condition 3, Condition 4, Condition 5, and Condition 6 can be applied to an MCF having cores that are not SI type by calculating an equivalent SI type refractive index profile based on an equivalent step index (ESI) approximation described in Non-Patent Literature 5. In this case, Δcore,s, which is Δcore on the ESI approximation, can be expressed by the following equation using an effective normalized frequency Veff described in Non-Patent Literature 5, a core radius ρs on the ESI approximation, a wavelength λ, and a refractive index n1 of each of the cores.

$$\Delta\text{core}, s \approx \frac{100}{2}\left(\frac{Veff}{\rho s}\frac{\lambda}{2\pi n1}\right)^2 \quad \text{[Math. 1]}$$

Here, Δcore,s is expressed in units of %, and the same unit is used for λ and ρs. Veff and n1 are dimensionless quantities. Core radius ρs and Δcore,s may be used as ra and Δcore in the present application.

Figure 4:
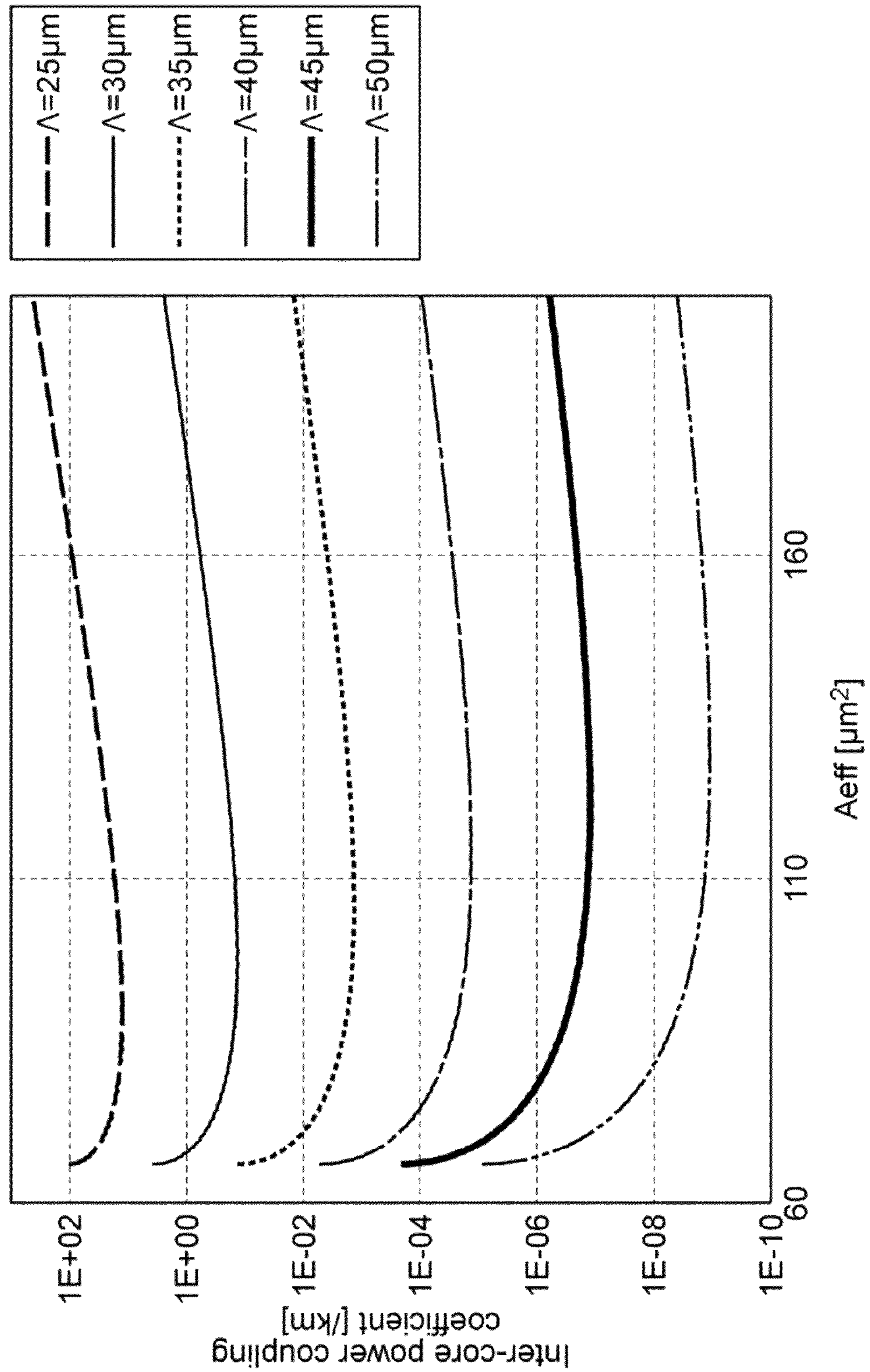
FIG. 4 is a graph showing a relationship between PCC and Aeff of each of the cores.

Next, with reference to FIG. 4, the results of examining a relationship between h and Aeff for each Δcore and for each Λ will be described. FIG. 4 is a graph showing a relationship between PCC and Aeff of each of cores. A vertical axis in FIG. 4 represents an inter-core PCC [/km]. A horizontal axis in FIG. 4 represents Aeff [$\mu m^2$]. FIG. 4 shows cases where a center-to-center distance Λ of each of the cores is set to 25 μm, 30 μm, 35 μm, 40 μm, 45 μm, and 50 μm. FIG. 4 shows a case where Δcore is 0.40%. Although not shown, the relationship between h and Aeff was similarly examined in a case where Δcore was in a range of 0.30% to 1.00%.

This result shows that h becomes a minimum value at different Aeff for each Λ. Aeff at which PCC h becomes the minimum value hmin in co-propagation between two adjacent cores is approximated by the above-described Aeff1. This approximation is valid at least for Δcore of 0.30% to 1.00% and Λ of 20 μm to 50 μm. A propagation in which directions of signal light propagating through two adjacent cores are the same as each other is referred to as co-propagation.

Figure 5:
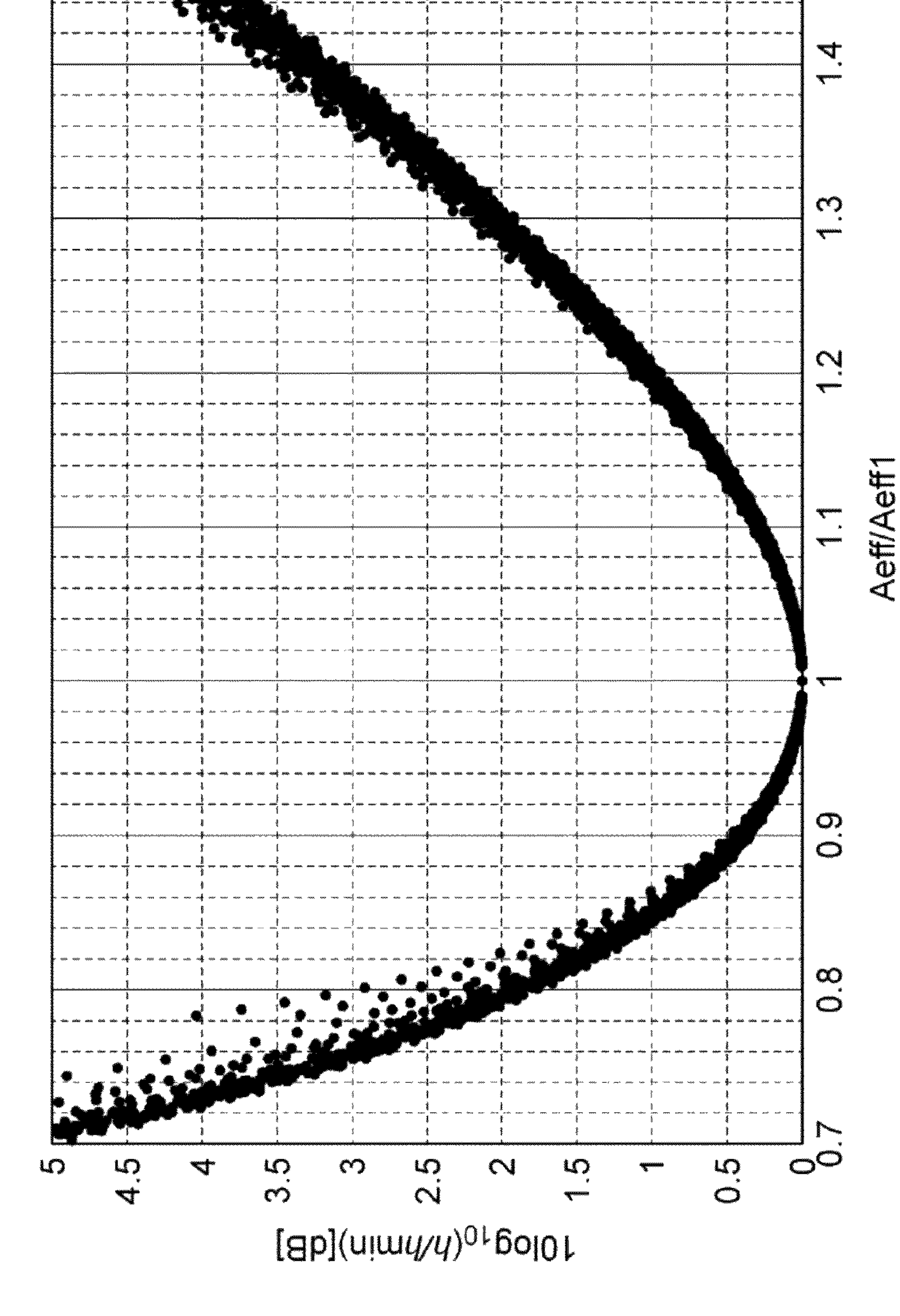
FIG. 5 is a plot of how much h increases as Aeff deviates from Aeff1.
Figure 6:
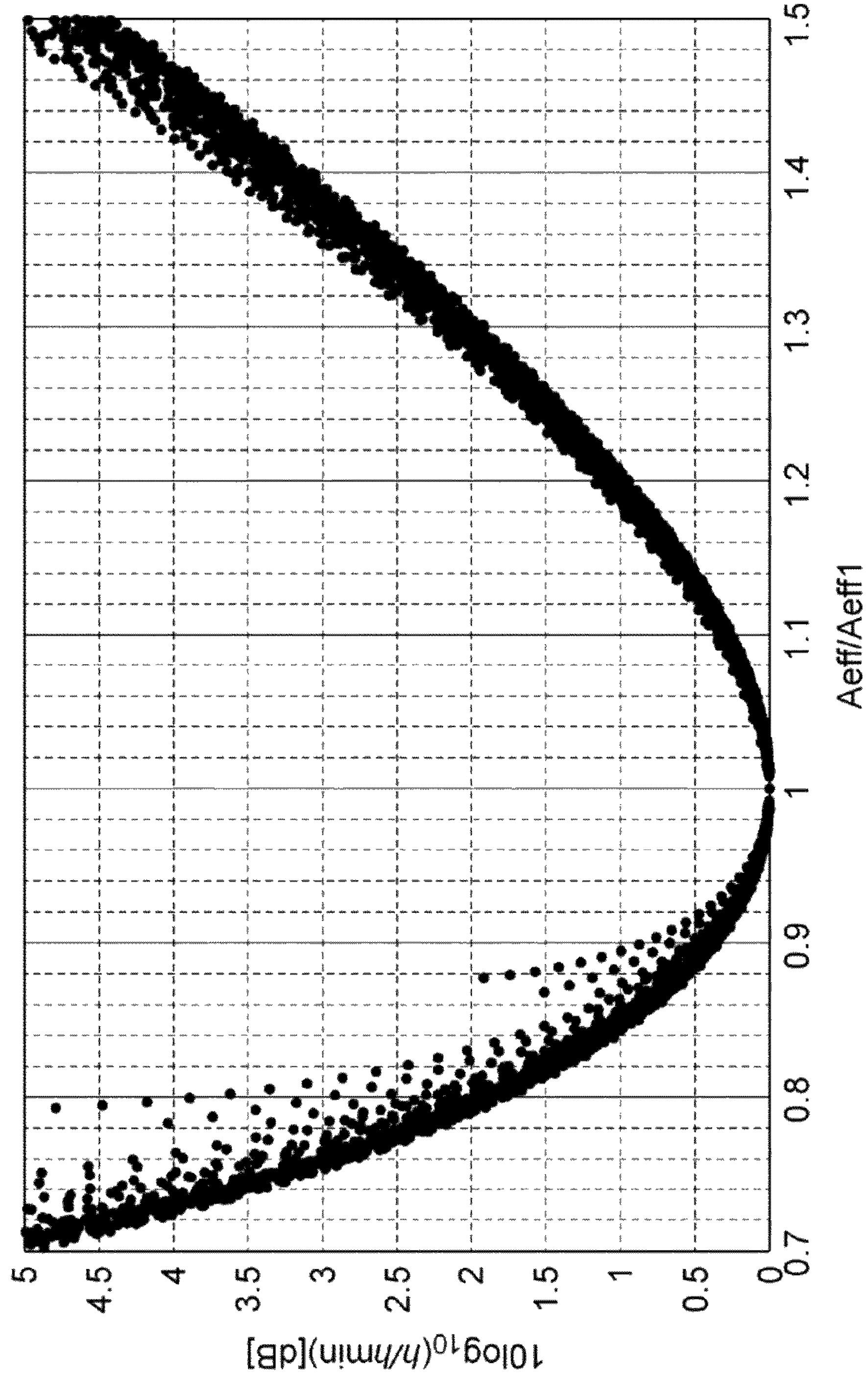
FIG. 6 is a plot of how much h increases as Aeff deviates from Aeff1.

FIG. 5 and FIG. 6 are plots of how much h increases as Aeff deviates from Aeff1. Horizontal axes in FIG. 5 and FIG. 6 represent Aeff/Aeff1. Vertical axes in FIG. 5 and FIG. 6 represent $10 \log_{10}$ (h/hmin). Here, a minimum value of h for each combination of Δcore and Λ is denoted as hmin. In FIG. 5, values are plotted for Δcore of 0.35% to 1.00% and Λ of 25 μm to 50 μm. In FIG. 6, values are plotted for Δcore of 0.30% to 1.00% and Λ of 20 μm to 50 μm.

The following can be confirmed from FIG. 5.

When an inequality below is satisfied, an increase in h from hmin is suppressed to 3 dB or less in dB value, which is desirable.

$$0.80Aeff1 \leq Aeff \leq 1.35Aeff1$$

When an inequality below is satisfied, an increase in h from hmin is suppressed to 1 dB or less in dB value, which is more desirable.

$$0.83Aeff1 \leq Aeff \leq 1.18Aeff1$$

When an inequality below is satisfied, an increase in h from hmin is suppressed to 0.5 dB or less in dB value, which is still more desirable.

$$0.90Aeff1 \leq Aeff \leq 1.12Aeff1$$

When an inequality below is satisfied, an increase in h from hmin is suppressed to 0.1 dB or less in dB value, which is most desirable.

$$0.95Aeff1 \leq Aeff \leq 1.05Aeff1$$

This result corresponds to Condition 1a described above.

It can be confirmed from FIG. 6 that the lower limit of a desirable Aeff is particularly narrowed when the lower limit of Δcore is extended to 0.30% and the lower limit of Λ is extended to 20 μm.

When an inequality below is satisfied, an increase in h from hmin is suppressed to 3 dB or less in dB value, which is desirable.

$$0.88Aeff1 \leq Aeff \leq 1.35Aeff1$$

When an inequality below is satisfied, an increase in h from hmin is suppressed to 1 dB or less in dB value, which is more desirable.

$$0.90Aeff1 \leq Aeff \leq 1.18Aeff1$$

When an inequality below is satisfied, an increase in h from hmin is suppressed to 0.5 dB or less in dB, which is still more desirable.

$$0.92Aeff1 \leq Aeff \leq 1.12Aeff1$$

When an inequality below is satisfied, an increase in h from hmin is suppressed to 0.1 dB or less in dB, which is most desirable.

$$0.96Aeff1 \leq Aeff \leq 1.05Aeff1$$

This result corresponds to Condition 2a described above.

As described in Non-Patent Literature 1, by making propagation directions of signal light in adjacent cores, that is, two adjacent cores, opposite to each other, an inter-core PCC and an inter-core XT of the adjacent cores can be reduced. At this time, Aeff at which PCCbs, which is PCC due to Rayleigh backscattering, reaches a minimum value or Aeff at which XTbs, which is XT due to Rayleigh backscattering, reaches a minimum value, that is, Aeff at which PCC h reaches a minimum value hmin in counter-propagation, is approximated by the above-described Aeff2. This approximation is valid at least for Δcore of 0.30% to 1.00% and Λ for 20 μm to 50 μm. A propagation in which directions of signal light propagating through two adjacent cores are opposite to each other is referred to as counter-propagation.

The following can be confirmed from the above approximation by Aeff2.

When an inequality below is satisfied, an increase in PCCbs from a minimum value and an increase in XTbs from a minimum value is suppressed to 3 dB or less in dB value, which is desirable.

$$0.75Aeff2 \leq Aeff \leq 1.36Aeff2$$

When an inequality below is satisfied, an increase in PCCbs from the minimum value and an increase in XTbs from the minimum value is suppressed to 1 dB or less in dB value, which is more desirable.

$$0.85Aeff2 \leq Aeff \leq 1.18Aeff2$$

When an inequality below is satisfied, an increase in PCCbs from the minimum value and an increase in XTbs from the minimum value is suppressed to 0.5 dB or less in dB value, which is still more desirable.

$$0.89\,Aeff2 \leq Aeff \leq 1.12\,Aeff2$$

When an inequality below is satisfied, an increase in PCCbs from the minimum value and an increase in XTbs from the minimum value is suppressed to 0.1 dB or less in dB value, which is most desirable.

$$0.95\,Aeff2 \leq Aeff \leq 1.05\,Aeff2$$

This result corresponds to Condition 1b described above.

It can be confirmed that the lower limit of a desirable Aeff is particularly narrowed when the lower limit of Δcore is extended to 0.30% and the lower limit of λ is extended to 20 μm.

When an inequality below is satisfied, an increase in PCCbs from the minimum value and an increase in XTbs from the minimum value is suppressed to 3 dB or less in dB value, which is desirable.

$$0.84\,Aeff2 \leq Aeff \leq 1.36\,Aeff2$$

When an inequality below is satisfied, an increase in PCCbs from the minimum value and an increase in XTbs from the minimum value is suppressed to 1 dB or less in dB value, which is more desirable.

$$0.88\,Aeff2 \leq Aeff \leq 1.18\,Aeff2$$

When an inequality below is satisfied, an increase in PCCbs from the minimum value and an increase in XTbs from the minimum value is suppressed to 0.5 dB or less in dB value, which is still more desirable.

$$0.90\,Aeff2 \leq Aeff \leq 1.12\,Aeff2$$

When an inequality below is satisfied, an increase in PCCbs from the minimum value and an increase in XTbs from the minimum value is suppressed to 0.1 dB or less in dB value, which is most desirable.

$$0.95\,Aeff2 \leq Aeff \leq 1.05\,Aeff2$$

This result corresponds to Condition 2b described above.

As described above, in MCF 1 according to the embodiment, first cladding 3 functions as a common depressed cladding layer. In MCF 1, a co-propagation PCC and a co-propagation XT can be reduced by satisfying Condition 1a or Condition 2a. By satisfying Condition 1b or Condition 2b, a counter-propagation PCC and a counter-propagation XT can be reduced. That is, in MCF 1, which is a common depressed cladding type, PCC and XT can be reduced more than in a SI type or matched cladding type MCF. Furthermore, by setting Aeff of each of cores 2 within an appropriate range, PCC and XT can be suppressed to values close to minimum values. In addition, since MCF 1 needs not have an individual refractive index structure surrounding each of cores 2 and surrounded by first cladding 3 for strengthening confinement in each of cores 2 in contrast to a trench-assisted type or hole-assisted type MCF, MCF 1 can be easily manufactured, and PCC and XT can be reduced.

Although the embodiments have been described above, the present disclosure is not necessarily limited to the above-described embodiments, and various modifications can be made without departing from the scope of the gist of the present disclosure.

Figure 7:
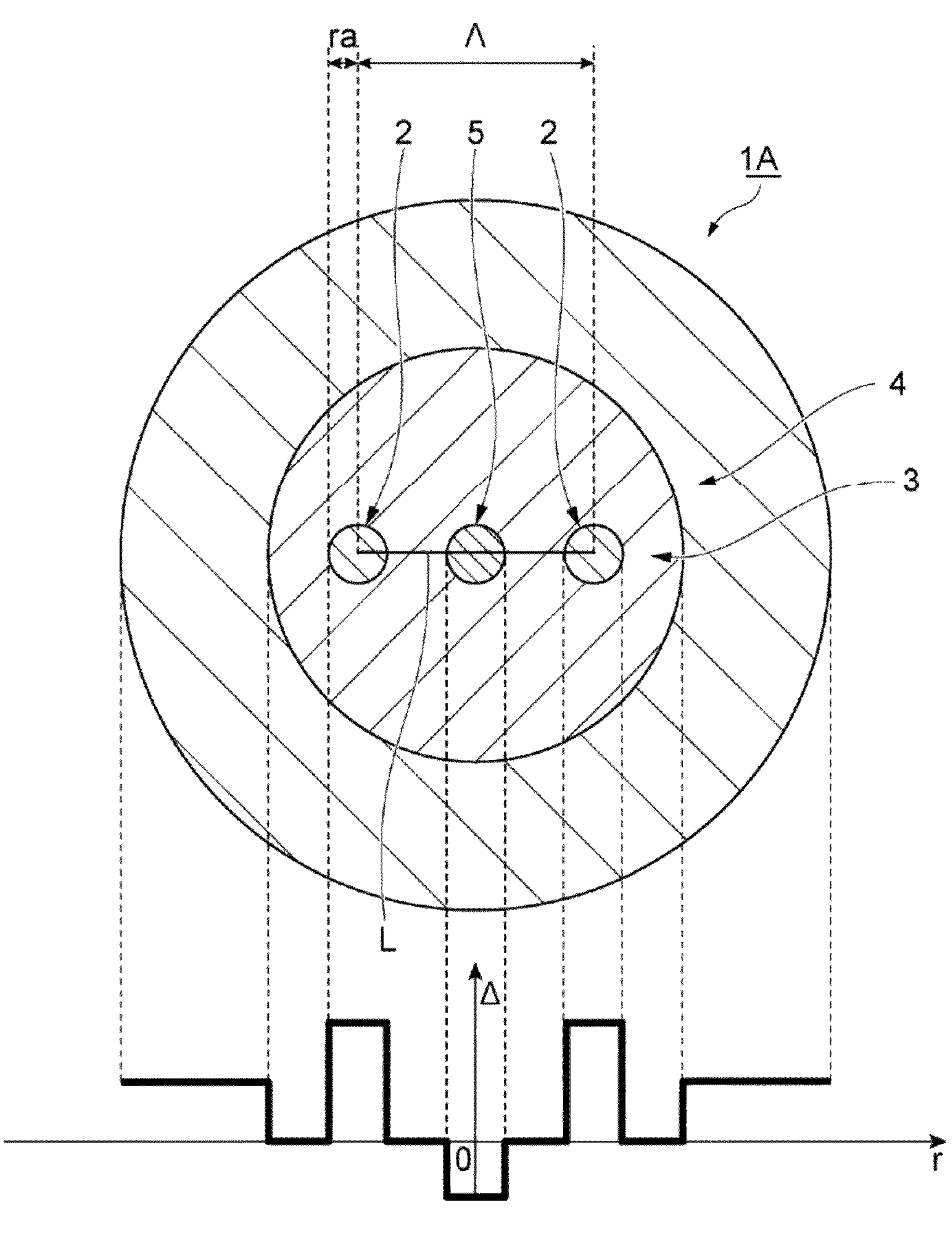
FIG. 7 is a diagram showing a cross section perpendicular to a fiber axis and a refractive index profile in an MCF according to a modification.

FIG. 7 is a diagram showing a cross section perpendicular to a fiber axis and a refractive index profile in an MCF according to a modification. As shown in FIG. 7, an MCF 1A according to the modification is different from MCF 1 shown in FIG. 2 in that MCF 1A further includes a third cladding 5. Third cladding 5 is surrounded by first cladding 3. Third cladding 5 is disposed on a line segment L connecting centers of two adjacent cores 2 in a cross section perpendicular to the fiber axis in such a manner so as to be separated from each of the two adjacent cores 2. Third cladding 5 covers none of the plurality of cores 2. This can further reduce an inter-core PCC h of the two adjacent cores 2.

Third cladding 5 has a circular shape in the cross section perpendicular to the fiber axis. This facilitates manufacturing. In the present embodiment, a radius of third cladding 5 is equal to a radius of each of cores 2, but may be different from the radius of each of cores 2. Third cladding 5 contains silica-based glass. Third cladding 5 has a refractive index lower than a refractive index of first cladding 3, and functions as a low refractive index pit. A relative refractive index difference of third cladding 5 with respect to the refractive index of first cladding 3 is, for example, from −0.8% to −0.1%. In this modification, in the cross section perpendicular to the fiber axis, third cladding 5 is located at an equal distance from the centers of two cores 2, and the center of third cladding 5 coincides with the center of MCF 1A.

The features and characteristics of the MCF of the present disclosure can be measured by the following methods. The refractive indices of the cores, the first cladding, and the second cladding can be measured by, for example, a refracted near-field method or transverse interferometry. The transmission loss can be measured by applying the method described in ITU-T G. 650.1 to each of the cores of the MCF. The effective area can be measured by, for example, the method described in Appendix III of ITU-T G. 650.2 (08/2015). The center-to-center distance between two cores adjacent to each other of the cores in the cross section perpendicular to the fiber axis can be measured by, for example, a refracted near-field method, transverse interferometry, or a microscopic observation image (transmitted near-field method) of an MCF cross section.

In the above description, the uncoupled MCF is described as an example, but the present invention is not limited thereto. Even in a coupled MCF (also referred to as a randomly coupled MCF) that allows an inter-core XT and increases the core density, when an inter-core coupling is too strong, the numerical calculation complexity increases for compensating for the inter-core XT. For that reason, by adopting a core structure in which an inter-core PCC can be lowered, the core density can be increased (an inter-core spacing can be narrowed). Thus, in both the uncoupled MCF and the coupled MCF, the inter-core PCC and the inter-core XT can be reduced while maintaining the optical characteristics of each of the cores at desired values within a range of an economically feasible refractive index profile.

In the above description, the MCF is described as an example that does not have an individual refractive index structure for strengthening confinement in each of the cores, but the present invention is not limited thereto. MCF may have an individual refractive index structure surrounding each of the cores and surrounded by the first cladding for strengthening confinement in each of the cores. For example, MCF may have a depressed cladding, a refractive index trench layer, and circularly arranged multi-hole structure.

REFERENCE SIGNS LIST

1, 1A MCF
2 core
3 first cladding
4 second cladding
5 third cladding
ra radius of core
L line segment
Λ center-to-center distance between adjacent cores
Δ relative refractive index difference

What is claimed is:

1. A common depressed cladding type multi-core optical fiber configured to be used for co-propagation, the multi-core optical fiber comprising:

a plurality of cores;

a common first cladding configured to surround each of the plurality of cores; and a second cladding configured to surround the first cladding, wherein the second cladding has a refractive index lower than a refractive index of each of the cores and higher than a refractive index of the first cladding, wherein the multi-core optical fiber has a transmission loss of 0.22 dB/km or less at a wavelength of 1550 nm, and wherein, when an effective area of each of the cores at a wavelength of 1550 nm is denoted as Aeff [$\mu m^2$], a center-to-center distance between two of the cores, the two cores being adjacent to each other, in a cross section perpendicular to a fiber axis is denoted as Λ [μm], and a relative refractive index difference of each of the cores with respect to the refractive index of the first cladding is denoted as Δcore [%], Aeff1 [$\mu m^2$] is defined by $$Aeff1 = 18.6 - 4.63\ln(\Delta core) + 1.24\Lambda + 24.1[\ln(\Delta core)]^2 - 6.05\times10^{-3}\Lambda^2 - 0.858\Lambda\ln(\Delta core),$$

and the multi-core optical fiber satisfies the following condition which is Condition 1a by using Aeff1 [$\mu m^2$]:

$$0.35\,[\%] \le \Delta core\,[\%] \le 1.00\,[\%]$$

$$25\,[\mu m] \le \Lambda\,[\mu m] \le 50\,[\mu m]$$

$$0.80\,Aeff1 \le Aeff \le 1.35\,Aeff1.$$

2. The multi-core optical fiber according to claim 1, wherein Condition 1a is further defined by an inequality below:

$$0.83\,Aeff1 \le Aeff \le 1.18\,Aeff1.$$

3. The multi-core optical fiber according to claim 1, wherein Condition 1a is further defined by an inequality below:

$$0.90\,Aeff1 \le Aeff \le 1.12\,Aeff1.$$

4. The multi-core optical fiber according to claim 1, wherein Condition 1a is further defined by an inequality below:

$$0.95\,Aeff1 \le Aeff \le 1.05\,Aeff1.$$

5. A common depressed cladding type multi-core optical fiber configured to be used for co-propagation, the multi-core optical fiber comprising:

a plurality of cores;

a common first cladding configured to surround each of the plurality of cores; and a second cladding configured to surround the first cladding, wherein the second cladding has a refractive index lower than a refractive index of each of the cores and higher than a refractive index of the first cladding, wherein the multi-core optical fiber has a transmission loss of 0.22 dB/km or less at a wavelength of 1550 nm, and wherein, when an effective area of each of the cores at a wavelength of 1550 nm is denoted as Aeff [$\mu m^2$], a center-to-center distance between two of the cores, the two cores being adjacent to each other, in a cross section perpendicular to a fiber axis is denoted as Λ [μm], and a relative refractive index difference of each of the cores with respect to the refractive index of the first cladding is denoted as Δcore [%], Aeff1 [$\mu m^2$] is defined by $$Aeff1 = 18.6 - 4.63\ln(\Delta core) + 1.24\Lambda + 24.1[\ln(\Delta core)]^2 - 6.05\times10^{-3}\Lambda^2 - 0.858\Lambda\ln(\Delta core),$$

and the multi-core optical fiber satisfies the following condition which is Condition 2a by using Aeff1 [$\mu m^2$]:

$$0.30[\%] \le \Delta core\,[\%] \le 0.35[\%],$$

$$20\,[\mu m] \le \Lambda\,[\mu m] \le 25\,[\mu m],$$

$$0.88\,Aeff1 \le Aeff \le 1.35\,Aeff1.$$

6. The multi-core optical fiber according to claim 5, wherein Condition 2a is further defined by an inequality below:

$$0.90\,Aeff1 \le Aeff \le 1.18\,Aeff1.$$

7. The multi-core optical fiber according to claim 5, wherein Condition 2a is further defined by an inequality below:

$$0.92\,Aeff1 \le Aeff \le 1.12\,Aeff1.$$

8. The multi-core optical fiber according to claim 5, wherein Condition 2a is further defined by an inequality below:

$$0.96\,Aeff1 \le Aeff \le 1.05\,Aeff1.$$

9. A common depressed cladding type multi-core optical fiber configured to be used for counter-propagation, the multi-core optical fiber comprising:

a plurality of cores;

a common first cladding configured to surround each of the plurality of cores; and a second cladding configured to surround the first cladding, wherein the second cladding has a refractive index lower than a refractive index of each of the cores and higher than a refractive index of the first cladding, wherein the multi-core optical fiber has a transmission loss of 0.22 dB/km or less at a wavelength of 1550 nm, and wherein, when an effective area of each of the cores at a wavelength of 1550 nm is denoted as Aeff [$\mu m^2$], a center-to-center distance between two of the cores, the two cores being adjacent to each other, in a cross section perpendicular to a fiber axis is denoted as $\Lambda$ [$\mu m$], and a relative refractive index difference of each of the cores with respect to the refractive index of the first cladding is denoted as $\Delta$core [%], Aeff2 [$\mu m^2$] is defined by $$Aeff2 = 19.2 - 3.01\ln(\Delta core) + 1.40\Lambda + 25.6[\ln(\Delta core)]^2 - 7.72\times10^{-3}\Lambda^2 - 0.980\Lambda\ln(\Delta core),$$

and the multi-core optical fiber satisfies the following condition which is Condition 1b by using Aeff2 [$\mu m^2$]:

$$0.35\,[\%] \le \Delta core\,[\%] \le 100\,[\%],$$

$$25\,[\mu m] \le \Lambda\,[\mu m] \le 50\,[\mu m],$$

$$0.75\,Aeff2 \le Aeff \le 1.36\,Aeff2.$$

10. The multi-core optical fiber according to claim 9, wherein Condition 1b is further defined by an inequality below:

$$0.85\,Aeff2 \le Aeff \le 1.18\,Aeff2.$$

11. The multi-core optical fiber according to claim 9, wherein Condition 1b is further defined by an inequality below:

$$0.89\,Aeff2 \le Aeff \le 1.12\,Aeff2.$$

12. The multi-core optical fiber according to claim 9, wherein Condition 1b is further defined by an inequality below:

$$0.95\,Aeff2 \le Aeff \le 1.05\,Aeff2.$$

13. A common depressed cladding type multi-core optical fiber configured to be used for counter-propagation, the multi-core optical fiber comprising:

a plurality of cores;

a common first cladding configured to surround each of the plurality of cores; and a second cladding configured to surround the first cladding, wherein the second cladding has a refractive index lower than a refractive index of each of the cores and higher than a refractive index of the first cladding, wherein the multi-core optical fiber has a transmission loss of 0.22 dB/km or less at a wavelength of 1550 nm, and wherein, when an effective area of each of the cores at a wavelength of 1550 nm is denoted as Aeff [$\mu m^2$], a center-to-center distance between two of the cores, the two cores being adjacent to each other, in a cross section perpendicular to a fiber axis is denoted as $\Lambda$ [$\mu m$], and a relative refractive index difference of each of the cores with respect to the refractive index of the first cladding is denoted as $\Delta$core [%], Aeff2 [$\mu m^2$] is defined by $$Aeff2 = 19.2 - 301\ln(\Delta core) + 1.40\Lambda + 25.6[\ln(\Delta core)]^2 - 7.72\times10^{-3}\Lambda^2 - 0.980\Lambda\ln(\Delta core),$$

and the multi-core optical fiber satisfies the following condition which is Condition 2b by using Aeff2 [$\mu m^2$]:

$$0.30\ [\%] \le \Delta core\ [\%] \le 0.35\ [\%],$$

$$20\ [\mu m] \le \Lambda\ [\mu m] \le 25\ [\mu m],$$

$$0.84\ Aeff2 \le Aeff \le 1.36\ Aeff2.$$

14. The multi-core optical fiber according to claim 13, wherein Condition 2b is further defined by an inequality below:

$$0.88\ Aeff2 \le Aeff \le 1.18\ Aeff2.$$

15. The multi-core optical fiber according to claim 13, wherein Condition 2b is further defined by an inequality below:

$$0.90\ Aeff2 \le Aeff \le 1.12\ Aeff2.$$

16. The multi-core optical fiber according to claim 13, wherein Condition 2b is further defined by an inequality below:

$$0.95\ Aeff2 \le Aeff \le 1.05\ Aeff2.$$

17. The multi-core optical fiber according to claim 1, wherein, when a radius of each of the cores is denoted as ra [μm], a cable cutoff wavelength is denoted as λcc [nm], and a relative refractive index difference of each of the cores with respect to the refractive index of the first cladding is denoted as Δcore [%], the multi-core optical fiber satisfies Condition 3, Condition 4, Condition 5, or Condition 6:

Condition 3 is defined by an inequality below:

$$\lambda cc\ [nm] \le 1260\ [nm],$$

$$ra \ge 2.51(\Delta core)^{-0.605}\ [\mu m].$$

Condition 4 is defined by an inequality below:

$$\lambda cc\ [nm] \le 1360\ [nm],$$

$$ra \ge 2.71(\Delta core)^{-0.607}\ [\mu m].$$

Condition 5 is defined by an inequality below:

$$\lambda cc\ [nm] \le 1460\ [nm],$$

$$ra \ge 2.92(\Delta core)^{-0.609}\ [\mu m].$$

Condition 6 is defined by an inequality below:

$$\lambda cc\ [nm] \le 1530\ [nm],$$

$$ra \ge 3.06(\Delta core)^{-0.611}\ [\mu m].$$

18. The multi-core optical fiber according to claim 1, further comprising:

a third cladding surrounded by the first cladding, wherein the third cladding is disposed on a line segment connecting centers of the two cores being adjacent to each other in the cross section perpendicular to the fiber axis in such a manner as to be separated from each of the two adjacent cores, and wherein the third cladding has a refractive index lower than the refractive index of the first cladding.

19. The multi-core optical fiber according to claim 18, wherein the third cladding has a circular shape in the cross section perpendicular to the fiber axis.

20. The multi-core optical fiber according to claim 1, wherein the plurality of cores, the first cladding, and the second cladding each contain silica-based glass.

21. The multi-core optical fiber according to claim 1, wherein multi-core optical fiber does not have an individual refractive index structure surrounding each of the cores and surrounded by the first cladding.

22. The multi-core optical fiber according to claim 1, wherein multi-core optical fiber has an individual refractive index structure surrounding each of the cores and surrounded by the first cladding.

* * * * *